United States Patent [19]

Jung

[11] Patent Number: 5,583,580
[45] Date of Patent: Dec. 10, 1996

[54] METHOD AND APPARATUS FOR DETECTING MOTION VECTORS BASED ON HIERARCHICAL MOTION ESTIMATION

[75] Inventor: Hae-Mook Jung, Seoul, Rep. of Korea

[73] Assignee: Daewoo Electronics Co., Ltd., Rep. of Korea

[21] Appl. No.: 529,476

[22] Filed: Sep. 18, 1995

[30] Foreign Application Priority Data

Oct. 8, 1994 [KR] Rep. of Korea ............... 95-24645

[51] Int. Cl.⁶ .................................................. H04N 7/32
[52] U.S. Cl. .................................................. 348/699
[58] Field of Search .......................... 348/699, 416, 348/413, 407, 408, 402; H04N 7/30, 7/32

[56] References Cited

U.S. PATENT DOCUMENTS

| | | | |
|---|---|---|---|
| 4,771,331 | 9/1988 | Bierling et al. | 348/396 |
| 4,980,764 | 12/1990 | Henot | 348/397 |
| 5,128,756 | 7/1992 | Johnston et al. | 348/699 |
| 5,276,513 | 1/1994 | Van Der Wal et al. | 348/699 |
| 5,444,489 | 8/1995 | Truong et al. | 348/422 |
| 5,473,378 | 12/1995 | Tamitani | 348/699 |
| 5,477,272 | 12/1995 | Zhang et al. | 348/699 |

OTHER PUBLICATIONS

M. Bierling, "Displacement Estimation by Hierarchical Blockmatching", SPIE vol. 1001, Visual Communications and Image Processing, 1988, pp. 942–950.

K. S. Seo and J. K. Kim, "Hierarchical Block–Motion Estimation Using Linear Model–Based Postprocessing", Electronics Letters, vol. 29, No. 22, Oct. 1993, pp. 1915–1916.

M. H. Ahmad Fadzil and T. J. Dennis, "A Hierarchical Motion Estimator for Interframe Coding", IEE Colloquium on Applications of Motion Compensation, Oct. 1990.

Yeu-Shen Jehng, Liang-Gee Chen and Tzi-Dar Chiueh, "An Efficient and Simple VLSI Tree Architecture for Motion Estimation Algorithms", IEEE Trans. on Sig. Proc., vol. 41, No. 2, Feb. 1993, pp. 889–900.

V. Venkateswar and R. Chellappa, "Hierarchical Feature Based Matching for Motion Correspondence", Visual Motion, 1991 IEEE Workshop, pp. 280–285.

V. Seferidis and M. Ghanbari, "Hierarchical Motion Estimation Using Texture Analysis", Image Processing and Its Applications (IEE Conf. Pub. 354), pp. 61–64.

Primary Examiner—Tommy P. Chin
Assistant Examiner—Vu Le
Attorney, Agent, or Firm—Pennie & Edmonds

[57] ABSTRACT

Motion vectors are determined between a current frame and a preceding frame within a frame duration by employing a time-sharing multi-tier hierarchical motion estimation approach, wherein the candidate blocks being grouped into a multiple number of hierarchical search areas. The motion vector determination scheme is initiated by performing a motion estimation of a highest hierarchy for all of the search blocks; and an error function and a motion vector of the highest hierarchy are stored. Subsequently, motion-estimation of a lower hierarchy is performed for each of the selected search blocks which have the error functions greater than the threshold value of the highest hierarchy. In the next step, the error functions of the highest and the lower hierarchies are compared for each of the selected search blocks and a smaller error function is selected therefrom to thereby update each of the stored potential motion vectors with the motion vector corresponding to the selected error function. The updating process is repeated for the next hierarchies and the stored potential motion vectors are provided as the motion vectors of the current frame when updating process for the stored potential motion vector for a predetermined lowest hierarchy is accomplished or the frame duration is exhausted.

6 Claims, 3 Drawing Sheets

METHOD AND APPARATUS FOR DETECTING MOTION VECTORS BASED ON HIERARCHICAL MOTION ESTIMATION

FIELD OF THE INVENTION

The present invention relates to a method and apparatus for determining motion vectors; and, more particularly, to an improved method and apparatus for determining motion vectors from two successive video frames through the use of time-sharing hierarchical motion estimation approach.

DESCRIPTION OF THE PRIOR ART

As is well known, transmission of digitized video signals can deliver video images of much higher quality than the transmission of analog signals. When an image signal comprising a sequence of image "frames" is expressed in a digital form, a substantial amount of data is generated for transmission, especially in the case of a high definition television(HDTV) system. Since, however, the available frequency bandwidth of a conventional transmission channel is limited, in order to transmit the substantial amounts of digital data through the limited channel bandwidth, it is inevitable to compress or reduce the volume of the transmission data. Among various video compression techniques, the so-called hybrid coding technique, which combines temporal and spatial compression techniques together with a statistical coding technique, is known to be most effective.

Most hybrid coding techniques employ a motion compensated DPCM(differential pulse code modulation), two-dimensional DCT(discrete cosine transform), quantization of DCT coefficients, and VLC(variable length coding). The motion compensated DPCM is a process of determining the movement of an object between a current frame and a previous frame, and predicting the current frame according to the motion flow of the object to produce a differential signal representing the difference between the current frame and its prediction.

The two-dimensional DCT, which reduces or removes spatial redundancies between image data such as motion compensated DPCM data, converts a block of digital image data, for example, a block of 8×8 pixels, into a set of transform coefficient data. This technique is described in, e.g., Chen and Pratt, "Scene Adaptive Coder", *IEEE Transactions on Communications*, COM-32, No. 3, pp. 225–232(March 1984). By processing such transform coefficient data with a quantizer, zigzag scanning, and VLC, the amount of data to be transmitted can be effectively compressed.

Specifically, in the motion compensated DPCM, current frame data is predicted from previous frame data based on an estimation of the motion between the current and the previous frames. Such estimated motion may be described in terms of two dimensional motion vectors representing the displacement of pixels between the previous and the current frames.

One of the methods which have been used most frequently in estimating the displacement of an object in a video sequence is the block matching algorithm. According to the block matching algorithm, a current frame is divided into a plurality of search blocks. The size of a search block typically ranges between 8×8 and 32×32 pixels. To determine a motion vector for a search block in the current frame, a similarity calculation is performed between the search block of the current frame and each of a plurality of equal-sized candidate blocks included in a generally larger search region within a previous frame. An error function such as the mean absolute error or mean square error is used to carry out a similarity measurement between the search block of the current frame and each of the candidate blocks in the search region. And a motion vector, by definition, represents the displacement between the search block and a candidate block which yields a minimum error function. Since the search block is compared with all possible candidate blocks within a search region corresponding to the search block (e.g., full search block matching), there occurs heavy computational requirement, which in turn entails complex hardware having the capability of very high speed processing and/or a large number of processors for real-time processing.

In light of the severe computational demands in a full search block matching procedure, therefore, simplified algorithms have been proposed(see, e.g., J. R. Jain et al., "Displacement Measurement and Its Application in Interframe Image Coding", *IEEE Transactions of Communications* COM-29, No. 12, pp. 1799–1808 (December 1981)). The simplified algorithm proposed therein searches for the direction of minimum distortion, wherein the search is accomplished by successively reducing the areas of search. The initial step consists of searching for a candidate block which yields a minimum error function among five candidate blocks positioned at predetermined locations within a search region. After detecting the candidate block having the minimum error function, the process is repeated for five candidate blocks at predetermined locations on a search area determined by the detected candidate block. The procedure is continued until the search area reduces to a size of 3×3 candidate blocks. In the final step, a candidate block which produces a minimum error function among the nine candidate blocks is determined as a most similar candidate block of a search block; and the displacement therebetween is asserted as a motion vector of the search block.

Although this simplified searching method may reduce the computational burden and the hardware requirement, it does not necessarily provide an optimal implementation of the block matching algorithm since the determined motion vector may reflect a candidate block having a local minimum error function rather than the most similar candidate block which can be found by the full search block matching.

SUMMARY OF THE INVENTION

It is, therefore, an object of the present invention to provide an improved method and apparatus for providing motion vectors by employing a time-sharing hierarchical motion estimation approach with a reduced hardware requirement, wherein in each hierarchy a motion vector of a search block is searched within a predetermined search area included in a search region corresponding to the search block.

In accordance with the present invention, there is provided a method for determining motion vectors between a current frame and a preceding frame within a frame duration by employing a time-sharing multi-tier hierarchical motion estimation, wherein the current frame is divided into a plurality of search blocks of an identical size and the preceding frame is divided into a corresponding number of search regions, each search region being further divided into a multiplicity of candidate blocks of said identical size, the candidate blocks being grouped into a multiple number of hierarchical search areas from a highest hierarchy to a lowest hierarchy, which comprises the steps of:

(a) motion-estimating each of the search blocks in the current frame with respect to a corresponding search area of the highest hierarchy to provide a potential motion vector and a minimum error function for each of the search blocks, said potential motion vector representing the displacement between each of the search blocks and a candidate block which yields said minimum error function;

(b) storing the minimum error function and the potential motion vector for each of the search blocks;

(c) comparing the minimum error function for each of the search blocks with a threshold value of the highest hierarchy to thereby select search blocks having minimum error functions greater than the threshold value of the highest hierarchy as selected search blocks;

(d) motion-estimating each of the selected search blocks with respect to a corresponding search area of a lower hierarchy to provide a potential motion vector and a minimum error function of the lower hierarchy for each of the selected search blocks, said potential motion vector of the lower hierarchy representing the displacement between each of the selected search blocks and a candidate block which yields said minimum error function of the lower hierarchy;

(e) selecting, for each of the selected search blocks, a minimum error function having a smaller value between the stored minimum error function corresponding to said each of the selected search blocks and the minimum error function of the lower hierarchy and generating a selection signal representing the selected minimum error functions for the selected search blocks;

(f) updating the stored minimum error functions for selected search blocks with the selected minimum error functions;

(g) selecting, in response to the selection signal, the potential motion vectors corresponding to the selected minimum error functions as selected potential motion vectors for the selected search blocks;

(h) updating the stored potential motion vectors for the selected search blocks with the selected potential motion vectors;

(i) comparing the selected minimum error function for each of the selected search blocks with a threshold value of the lower hierarchy to thereby select search blocks having selected minimum error functions greater than the threshold value of the lower hierarchy as the selected search blocks for next lower hierarchy;

(j) subjecting said steps (d) to (i) for the search blocks selected in step (i) until updating process of the stored potential motion vectors for the lowest hierarchy is accomplished or the frame duration is exhausted; and (k) providing the stored potential motion vectors as the motion vectors of the current frame.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
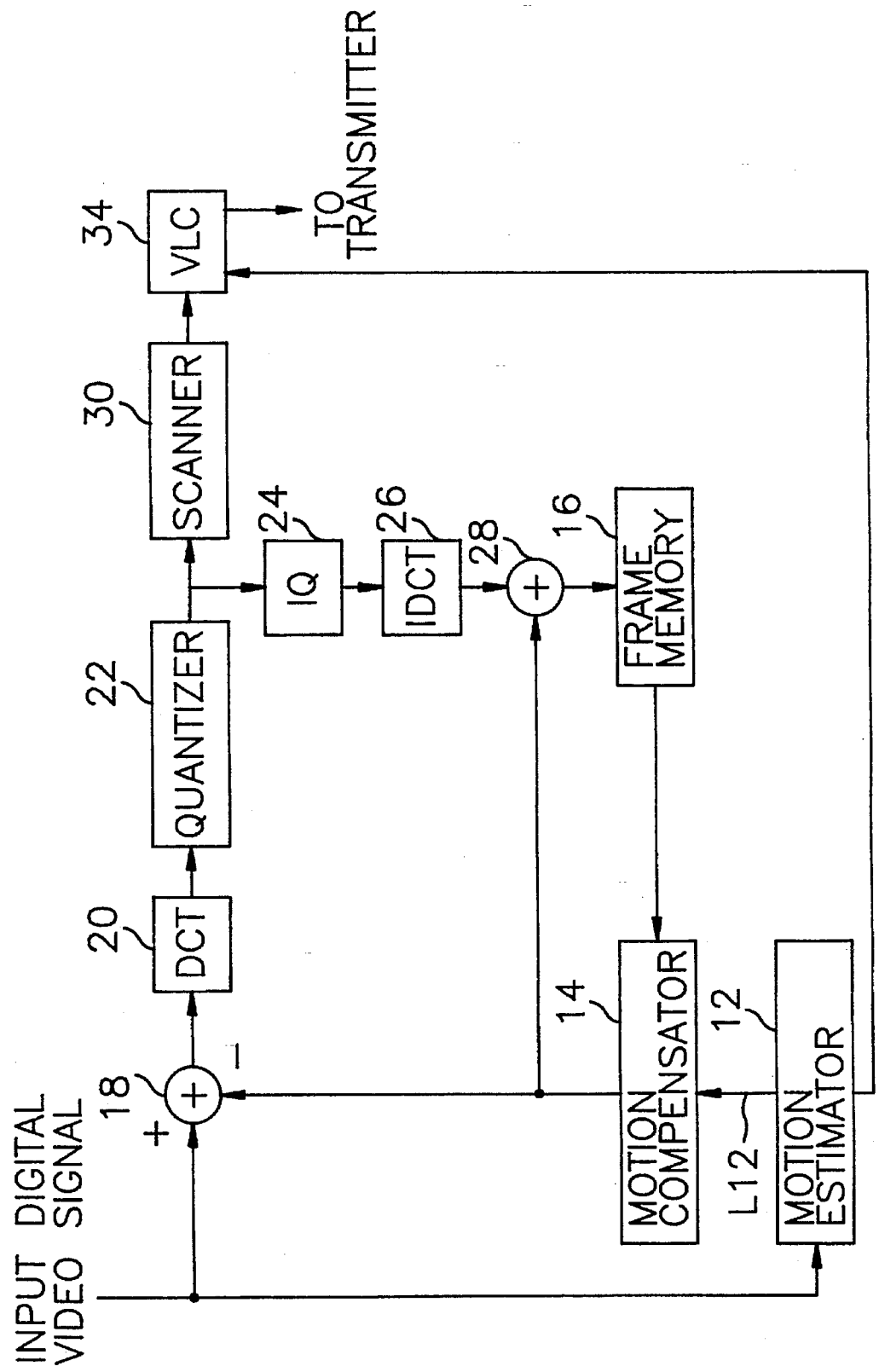
FIG. 1 illustrates a block diagram of an encoding system which comprises a motion estimator of the present invention.

Referring to FIG. 1, there is shown a block diagram of an encoding system for compressing a digital video signal, which comprises a motion estimator 12, of the present invention. Current frame data is fed as an input digital video signal to a subtractor 18 and the motion estimator 12. Actually, the input digital video signal is read, on a block-by-block basis, from an input memory(not shown) wherein each frame of video signals is stored as successive blocks of pixel data for processing on a block-by-block basis. The block size of the input digital video signal typically ranges between 8×8 and 32×32 pixels.

The motion estimator 12 of the present invention serves to determine a motion vector for each of the search blocks by employing the inventive time-sharing hierarchical motion estimation method and apparatus which will be described hereinafter with reference to FIGS. 2 and 3. After determining the motion vectors for the whole search blocks of the current frame, the motion vectors are fed to the motion compensator 14 and a variable length coding (VLC) coder 34.

In response to each of the motion vectors, a prediction signal, i.e., pixel data of a candidate block corresponding to the motion vector is extracted from a frame memory 16 and provided to the subtractor 18 and an adder 28 by the motion compensator 14. The prediction signal from the motion compensator 14 is subtracted from the input digital video signal at the subtractor 18; and the resultant data, i.e., an error signal, is dispatched to a transform coder, e.g., a DCT coder 20, wherein a block of the error signal, for instance, a block of 8×8 pixel data, is encoded into a block of transform coefficient data. Those skilled in the art will appreciate that other transform techniques may be employed in lieu of the DCT described herein.

At a quantizer 22, the transform coefficients from the DCT coder 20 are quantized into a set of quantized DCT coefficients which is subsequently fed to a scanner 30 and an inverse quantizer(IQ) 24. The quantized DCT coefficients are converted back into a set of reconstructed DCT coefficients at the IQ 24. The set of reconstructed DCT coefficients is then applied to an inverse discrete cosine transformer(IDCT) 26 and transformed therein into a block of reconstructed pixel data. At the adder 28, the prediction signal from the motion compensator 14 and the block of reconstructed pixel data from IDCT 26 are summed to provide a reconstructed block signal of the current frame to be written onto the frame memory 16. The frame memory 16 has two frame memory locations storing the current and the previous frame data. The output signal from the adder 28 comprises blocks of pixel data. When all of the blocks representing the current frame are stored in the frame memory 16, new frame data is provided from the adder 28. At this moment, the new data is referred to as a current frame and the current frame data previously stored in the frame memory 16 is referred to as the previous frame.

In the meantime, the quantized DCT coefficients from the quantizer 22 are transferred to the scanner 30 which scans the quantized DCT coefficients in, e.g., a zigzag fashion appropriate for such a statistical coder as the VLC coder 34, starting from a value corresponding to the DC component of the DCT coefficients. The VLC coder 34 converts the scanned data into a set of variable length coded data. The VLC coder 34 is basically a look-up table: that is, in the VLC coder 34, a plurality of code sets is provided to define a respective relationship between each set of a zeros run-length and a level of the quantized DCT coefficients and its variable length code, wherein a level is a quantized DCT coefficient with a non-zero value and a zeros run-length refers to the total number of successive zeros preceding the level in the scanning sequence. It should be noted that other statistical coding techniques may be employed in lieu of the VLC described herein. The motion vectors from the motion compensator 12 are also coded by the VLC coder 34. The encoded data from the VLC coder 34 is applied to a transmitter (not shown) for the transmission thereof.

Figure 2:
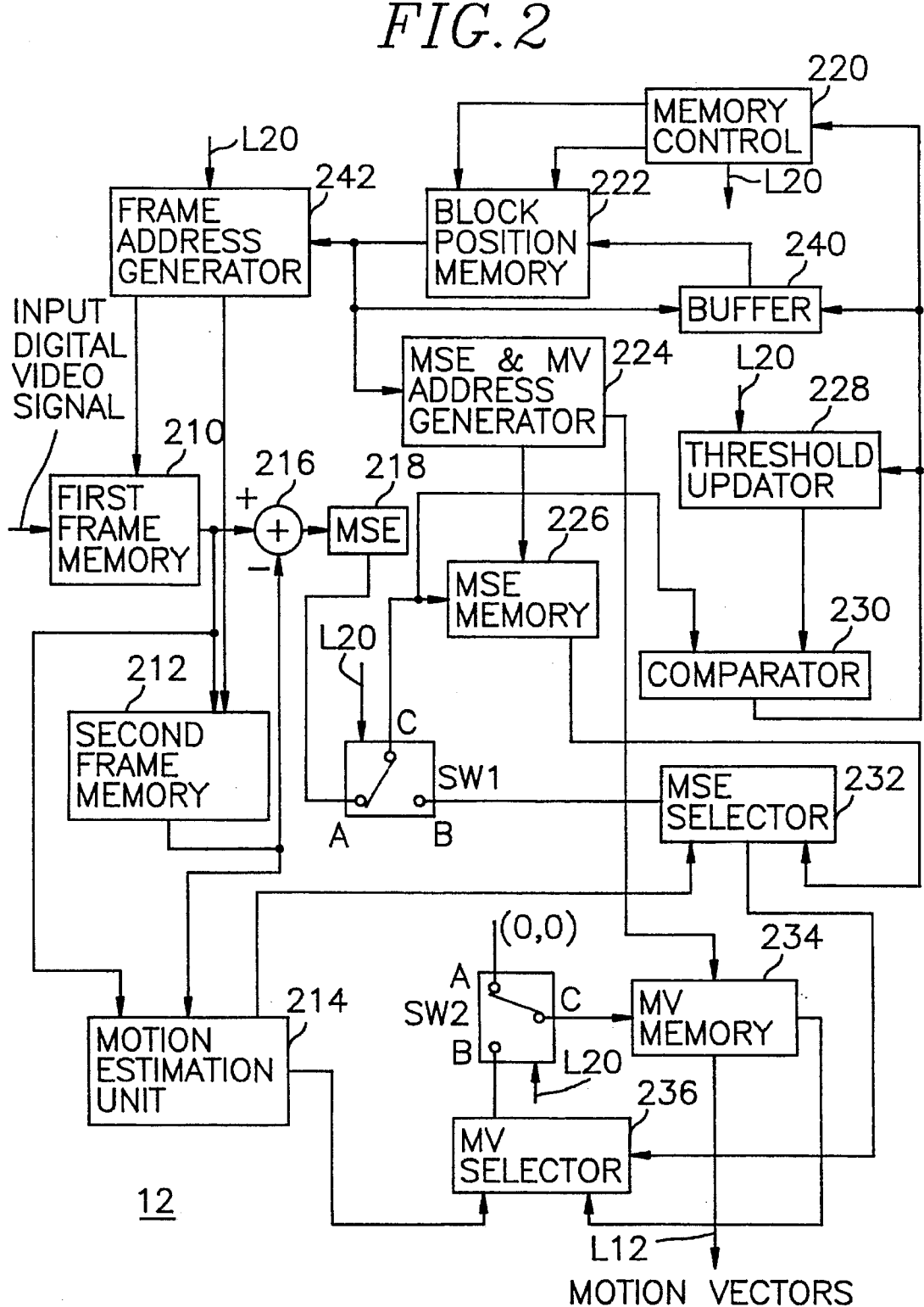
FIG. 2 shows a detailed block diagram of the motion estimator shown in FIG. 1.
Figure 3:
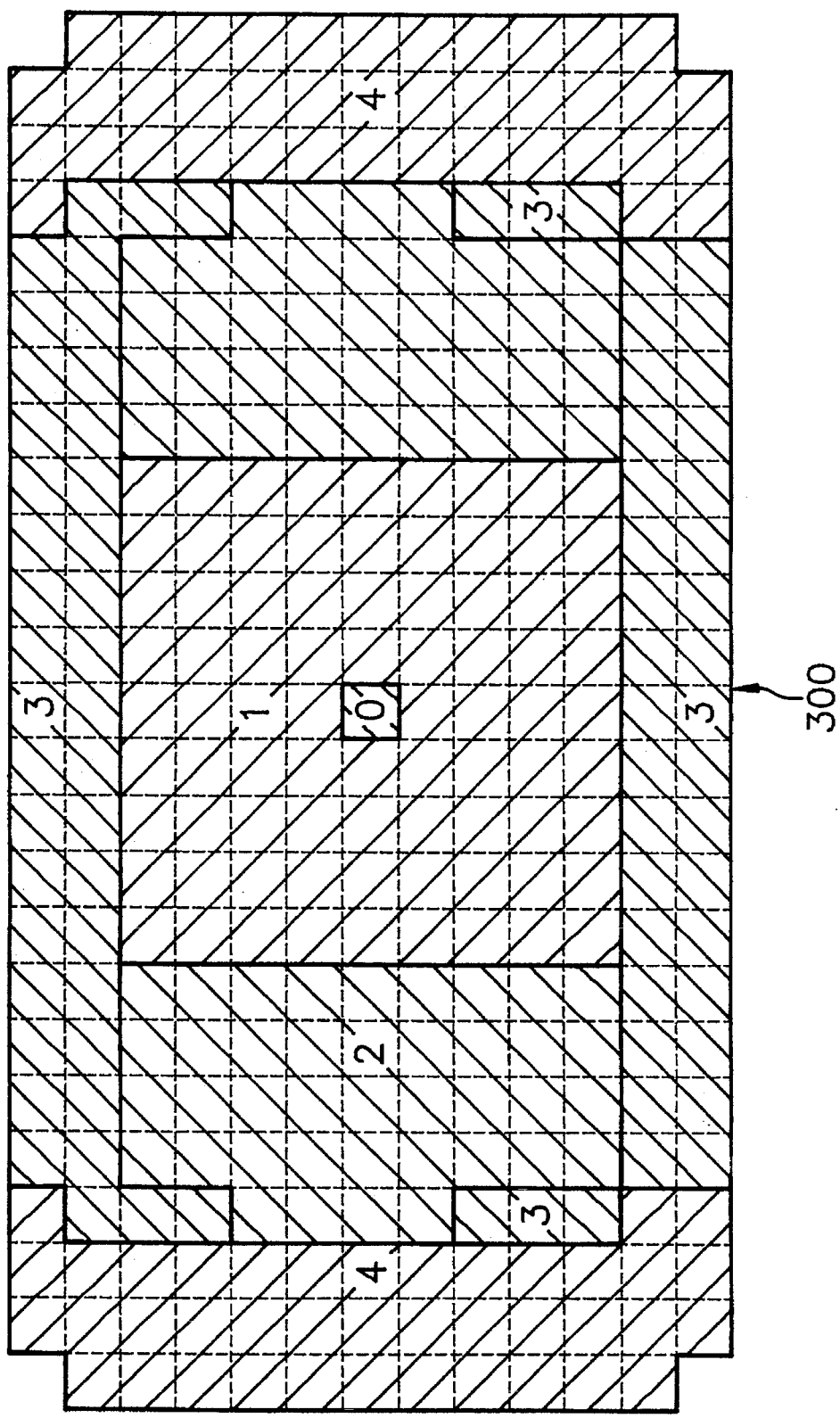
FIG. 3 depicts an exemplary structure of the hierarchical search areas employed in the present invention.

With reference to FIGS. 2 and 3, a time-sharing hierarchical motion estimation of the present invention is described. In FIG. 2, there is illustrated a block diagram of the motion estimator 12 depicted in FIG. 1. The input digital video signal is stored in a first frame memory 210 as a current frame and in a second frame memory 212 as a previous frame. In accordance with the present invention, the motion estimation of the current frame is carried out by grouping candidate blocks within a search region into a multiplicity of, e.g., 5, hierarchical search areas.

According to the conventional blocking matching algorithm, a current frame is divided into a plurality of search blocks of an identical size, e.g., 16×16 pixels. To determine a motion vector for a search block, a similarity calculation is carried out between the search block and each of a multiple number of equal-sized candidate blocks included in a generally larger search region within a previous frame, the search region being defined by a predetermined search range, e.g., of +/−12 and +/−6 pixels in,the horizontal and vertical directions, respectively.

Referring to FIG. 3, there is depicted an exemplary drawing for representing hierarchical search areas employed in the inventive motion estimation approach. In the drawing, each of the squares enclosed by lines represents, e.g., a left-top corner pixel of a candidate block included in a search region, which in turn represents a candidate block included in a search region 300. In the preferred embodiment of the invention, it is assumed that the maximum search ranges are +/−12 and +/−6 pixels in the horizontal and vertical directions, respectively, and the search region 300 includes 321 candidate blocks, excluding four corner candidate blocks from the region defined by the search ranges. The search region 300 is divided, or, in other words, the 321 candidate blocks are grouped, into a multiplicity of, e.g., 5, search areas in order to carried out time-sharing hierarchical motion estimation in accordance with the present invention, wherein numerals 0 to 4 depicted inside the search region 300 represent respective levels of the hierarchical search areas. In the preferred embodiment of the invention, the level-0 search area depicted by 0 in the drawing includes one candidate block, which is located at the same position as that of the search block, and the remaining level-1 to level-4 search areas include 80 candidate blocks, respectively. It should be noted that the present invention can be accomplished in a different manner, but not limited thereto, by. e.g, constructing respective search areas to have different numbers of candidate blocks other than those described above.

Referring back to FIG. 2, the inventive hierarchical motion estimation of the current frame is initiated by motion-estimating each of the search blocks with respect to their corresponding level-0 search areas. In order to carry out level-0 motion estimation, a memory control 220 issues a read address for each of the search blocks to a block position memory 222 and level-0 information on a line L20, wherein the read address represents an address on which position data for the respective search block resides in the block position memory 222. In response to the read address, the position data for the search block to be processed is retrieved from the block position memory 222 to a frame address generator 242 and a MSE(mean square error) & MV(motion vector) address generator 224. The position data is also provided to a buffer 240 and stored therein temporarily.

Subsequently, in response to the position data for each of the search blocks and level-0 information on the line L20, the frame address generator 242 provides the first and second frame memories 210 and 212 with address data for the search block and a candidate block in the corresponding level-0 search area, respectively. At an adder 216, pixel data of the candidate block retrieved from the second frame memory 212 is subtracted from that of the search block retrieved from the first frame memory 210; and the resultant data, i.e., a difference signal therebetween, is fed to an MSE block 218, wherein an error function, e.g., MSE, of the difference signal is calculated. The MSE for each of the search block is then applied to an input terminal A of a switch SW1, which couples the input terminal A to its output terminal C in response to the level-0 information on the line L20. In the meantime, an input and an output terminals A and C of a switch SW2 are also coupled together by the level-0 information on the line L20, enabling a zero valued motion vector for each of the search blocks on the input terminal A is fed to an MV memory 234 wherein the zero valued motion vectors are stored therein as potential motion vectors for the search blocks.

The MSE & MV address generator 224 is responsive to the position data from the block position memory 222 and serves to generate a necessary address data to the MSE memory 226 and the MV memory 234 in order to store the data on the output terminals C of the switches SW1 and SW2 at appropriate storage area of the memories 226 and 234, respectively.

At a comparator 230, the level-0 MSE value for each of the search blocks is compared with a level-0 threshold value from a threshold updator 228. In accordance the preferred embodiment of the present invention, the threshold updator 228 provides a predetermined level-0 threshold value, but generates updated threshold values for other levels instead, which are adjusted adaptively in accordance with a job progress determined with respect to the amount of the job to be carried out, as will be described in more detail hereinafter. It should be noted, however, that the level-0 threshold value can be made to be adjusted in accordance with the characteristics of the input digital video signal, e.g., a variance thereof, as long as that is more conducive to the better estimation of the motion vectors.

The comparator 230 of the present invention provides a logic high comparison signal to the threshold updator 228, the buffer 240 and the memory control 220 if the MSE value on the output terminal C of the switch SW1 is larger than the level-0 threshold value and logic low comparison signal, otherwise. In response to the logic high comparison signal from the comparator 230 and the level-0 information on the line L20, the threshold updator 228 counts a number of search blocks having level-0 MSE values greater than the level-0 threshold value. The counted number is used in updating a next level, i.e., level-1, threshold value. The detailed scheme for updating a threshold value for a subsequent level will be described hereinafter.

If the comparison signal from the comparator 230 is logic high, the memory control 220 issues a write address to the block position memory 222, thereby enabling the position data, which is temporarily stored in the buffer 240, for the each of the search blocks having an MSE value larger than the level-0 threshold value to be written onto the block position memory 222. After performing the level-0 motion estimation for all of the search blocks within the current frame in the manner described above, the MSE memory 226 and the MV memory 234 store the MSE value and the zero valued potential motion vector for each of the search blocks, respectively; and the block position memory 222 stores the position data of the search blocks having level-0 MSE values which are greater than the predetermined level-0 threshold value.

The block position memory 222 of the present invention has the prestored position data of all of the search blocks for processing the level-0 motion estimation and an additional memory space for temporarily storing position data for search blocks to be processed in a next level motion estimation. In the preferred embodiment of the invention, the prestored position data and the temporarily stored position data to be used in the next level motion estimation are stored in the block position memory 222 in a circular queue fashion well known in the art for an efficient memory access.

Upon completing the level-0 motion estimation for all of the search blocks, the memory control 220 provides level-1 information on the line L20 and generates read addresses for sequentially retrieving position data for the search blocks which generated level-0 MSE values greater than the predetermined level-0 threshold value. The position data for each of the search blocks to be processed in the level-1 motion estimation process is retrieved from the block position memory 222 and provided to the frame address generator 242, buffer 240, and MSE & MV address generator 224.

In response to the position data from the block position memory 222 and the level-1 information on the line L20, the frame address generator 242 generates to the first and the second frame memories 210 and 212 a first set of address data corresponding to the search block and a second set of address data for retrieving pixel data of candidate blocks within a corresponding level-1 search area of the search block, respectively. By employing a conventional motion estimation technique, a motion estimation unit 214 then performs a level-1 motion estimation of the search block based on the pixel data of the search block from the first frame memory 210 and those for the candidate blocks in the corresponding level-1 search area, to thereby provide a least level-1 MSE value and a corresponding level-1 motion vector of the search block to an MSE selector 232 and an MV selector 236, respectively.

The MSE selector 232 then compares the least level-1 MSE value with the level-0 MSE value of the same search block, which is retrieved from the MSE memory 226 by the MSE & MV address generator 224; and selects a smaller MSE value among those two to provide the selected MSE value to the input terminal B of the switch SW1 and a selection signal representing the selected MSE value to the MV selector 236. If those two MSE values have an identical value, the MSE value of a higher hierarchy, i.e., level-0 MSE value, is determined as the selected MSE value. In response to the selection signal from the MSE selector 232, the MV selector 236 selects, as a potential motion vector for the search block, the motion vector, which corresponds to the selected MSE value, among the level-1 motion vector from the motion estimation unit 214 and the zero valued potential motion vector retrieved from the MV memory 234 by the MSE & MV address generator 224 and provides the selected motion vector to the input terminal B of the switch SW2.

In the preferred embodiment of the present invention, the respective output terminals C and input terminals B of the switches SW1 and SW2 are coupled together in response to the level information representing one of other levels than level-0, and, accordingly, the selected MSE value and the motion vector on the terminals C are coupled to the respective memories 226 and 234 and are stored therein as the level-1 MSE value and the potential motion vector for the search block, respectively.

In the meanwhile, at the comparator 230, the selected MSE value on the terminal C of the switch SW1 is compared with a updated level-1 threshold value provided from the threshold updator 228. In a similar fashion as in the level-0 motion estimation process, the comparator 230 of the present invention provides a logic high comparison signal to the threshold updator 228, the buffer 240 and the memory control 220 if the MSE value on the output terminal C of the switch SW1 is larger than the level-1 threshold value and a logic low comparison signal, if otherwise. The logic high comparison signal and the level-1 information fed to the threshold updator 228 are used therein in counting a number of search blocks having selected MSE values greater than the level-1 threshold value. If the comparison signal from the comparator 230 is logic high, the memory control 220 issues a write address to the block position memory 222, thereby enabling the position data, which is temporarily stored in the buffer 240, for the each of the search blocks having a selected MSE value larger than the level-1 threshold value to be written onto the block position memory 222.

The level 2 to 4 motion estimations are carried in a similar manner as is done for the level-1 motion estimation except that the motion estimation is performed in the motion estimation unit 214 with respect to the corresponding search areas of their respective levels. After completing the level-4 motion estimation, the potential motion vectors stored in the MV memory 234 are provided as the motion vectors of the search blocks of the current frame to the motion compensator 14 shown in FIG. 1 via the line L12. If the whole motion estimation is not completed within a frame duration (e.g., 33.3 ms for the case of the video signal having a 30 frames per second frame rate) or, in other words, if the frame duration is all used up during any stage of the time-sharing hierarchical motion estimation of the present invention, the motion estimation is interrupted at that moment and the potential motion vectors stored in the MV memory 234 at the instance are provided as the motion vectors of the current frame; and the motion estimation resumes for the next frame.

In the preferred embodiment of the present invention, each of the threshold values for the levels 1 to 4 is updated based on the number of logic high comparison signals counted in the previous level, i.e., the number of search blocks the motion vectors of which have not been determined in any of the previous levels. For instance, assuming that a threshold value TH(i) for a level-i (i=1, 2, 3 and 4) is defined by TH(i)=TH(i−1)+(the number of logic high comparison signals counted in the level-(i−1))/100 and that the motion vectors of 400 search blocks have been determined out of total 1000 search blocks of the current frame during the level-0 motion estimation having a predetermined threshold value of TH(0), i.e., the counted value for the level-0 is 600, then the level-1 threshold value TH(1) is determined as TH(0)+6. In this example, if 500 motions vectors are further determined in the level-1 motion estimation, the level-2 threshold value TH(2) becomes TH(1)+1, and so on. In another preferred embodiment of the invention for refining the threshold updating scheme, the processing time consumed during the motion estimation of the previous levels can be incorporated in determining a threshold value as well.

While the present invention has been described with respect to the particular embodiments, it will be apparent to those skilled in the art that various changes and modifications may be made without departing from the spirit and scope of the invention as defined in the following claims.

What is claimed is:

1. A method for determining motion vectors between a current frame and a preceding frame within a frame duration by employing a time-sharing multi-tier hierarchical motion estimation, wherein the current frame is divided into a plurality of search blocks of an identical size and the preceding frame is divided into a corresponding number of search regions, each search region being further divided into a multiplicity of candidate blocks of said identical size, the candidate blocks being grouped into a multiple number of search areas of different hierarchies from a highest hierarchy to a lowest hierarchy, which comprises the steps of:

(a) motion-estimating each of the search blocks in the current frame with respect to a corresponding search area of the highest hierarchy to provide a potential motion vector and a minimum error function for each of the search blocks, said potential motion vector representing the displacement between each of the search blocks and a candidate block which yields said minimum error function;

(b) storing the minimum error function and the potential motion vector for each of the search blocks;

(c) comparing the minimum error function for each of the search blocks with a threshold value of the highest hierarchy to thereby select search blocks having minimum error functions greater than the threshold value of the highest hierarchy as selected search blocks;

(d) motion-estimating each of the selected search blocks with respect to a corresponding search area of a lower hierarchy to provide a potential motion vector and a minimum error function of the lower hierarchy for each of the selected search blocks, said potential motion vector of the lower hierarchy representing the displacement between each of the selected search blocks and a candidate block which yields said minimum error function of the lower hierarchy;

(e) selecting, for each of the selected search blocks, a minimum error function having a smaller value between the stored minimum error function corresponding to said each of the selected search blocks and the minimum error function of the lower hierarchy and generating a selection signal representing the selected minimum error functions for the selected search blocks;

(f) updating the stored minimum error functions for selected search blocks with the selected minimum error functions;

(g) selecting, in response to the selection signal, the potential motion vectors corresponding to the selected minimum error functions as selected potential motion vectors for the selected search blocks;

(h) updating the stored potential motion vectors for the selected search blocks with the selected potential motion vectors;

(i) comparing the selected minimum error function for each of the selected search blocks with a threshold value of the lower hierarchy to thereby select search blocks having selected minimum error functions greater than the threshold value of the lower hierarchy as the selected search blocks for a next lower hierarchy;

(j) subjecting to said steps (d) to (i) the search blocks selected in step (i) until said updating process in said step (h) above has been accomplished with respect to the stored potential motion vectors for the lowest hierarchy or the frame duration has been exhausted; and (k) providing the stored potential motion vectors as the motion vectors of the current frame.

2. The method according to claim 1, wherein said search area of the highest hierarchy includes one candidate block and each of the remaining search areas has an identical number of candidate blocks.

3. The method according to claim 2, wherein said threshold value of the highest hierarchy is of a predetermined value and the threshold value of a lower hierarchy is determined based on the number of search blocks having error functions smaller than or equal to the threshold value of its higher hierarchy.

4. An apparatus for determining motion vectors between a current frame and a preceding frame within a frame duration by employing a time sharing multi-tier hierarchical motion estimation approach, wherein the current frame is divided into a plurality of search blocks of an identical size and the preceding frame is divided into a corresponding number of search regions, each search region being further divided into a multiplicity of candidate blocks of said identical size, the candidate blocks being grouped into a multiple number of search areas of different hierarchies from a highest hierarchy and to a lowest hierarchy, which comprises:

first motion estimation means for motion-estimating each of the search blocks in the current frame with respect to a corresponding search area of the highest hierarchy to provide a potential motion vector and a minimum error function for each of the search blocks, said potential motion vector representing the displacement between each of the search blocks and a candidate block which yields said minimum error function;

means for storing the minimum error function and the potential motion vector for each of the search blocks;

first comparison means for comparing the minimum error function for each of the search blocks with a threshold value of the highest hierarchy to thereby select search blocks having minimum error functions greater than the threshold value of the highest hierarchy;

second motion estimation means for motion-estimating each of the selected search blocks with respect to a corresponding search area of a lower hierarchy to provide a potential motion vector and a minimum error function of the lower hierarchy for each of the selected search blocks, said potential motion vector of the lower hierarchy representing the displacement between each of the selected search blocks and a candidate block which yields said minimum error function of the lower hierarchy;

first selection means for selecting, for each of the selected search blocks, a minimum error function having a smaller value between the stored minimum error function corresponding to each of the selected search blocks and the minimum error function of the lower hierarchy and generating a selection signal representing the selected minimum error functions for the selected search blocks;

first update means for updating the stored minimum error functions for the selected search block with the selected minimum error functions;

second selection means for selecting, in response to the selection signal, the potential motion vectors corresponding to the selected minimum error functions as selected potential motion vectors for the selected search blocks;

second update means for updating the stored potential motion vectors for the selected search block with the selected potential motion vectors;

second comparison means for comparing the selected minimum error function for each of the selected search blocks with a threshold value of the lower hierarchy to thereby select search blocks having selected minimum error functions greater than the threshold value of the lower hierarchy as the selected search blocks for a next lower hierarchy; and means for providing the stored potential motion vectors as the motion vectors of the current frame until said updating operations has been accomplished with respect to the stored potential motion vectors for the lowest hierarchy or the frame duration is exhausted.

5. The apparatus according to claim 4, wherein said search area of the highest hierarchy includes one candidate block and each of the remaining search areas has an identical number of candidate blocks.

6. The method according to claim 5, wherein said threshold value of the highest hierarchy is of a predetermined value and the threshold value of a lower hierarchy is determined based on the number of search blocks having error functions smaller than or equal to the threshold value of its higher hierarchy.

* * * * *